United States Patent
Coward et al.

(10) Patent No.: US 8,385,199 B1
(45) Date of Patent: Feb. 26, 2013

(54) ADAPTIVE TRAFFIC SHAPING FOR WIRELESS COMMUNICATION SYSTEMS

(75) Inventors: Michael Hamilton Coward, Solana Beach, CA (US); Manish Singh, San Diego, CA (US); Renuka Bhalerao, San Diego, CA (US)

(73) Assignee: Radisys Corporation, Hillsboro, OR (US)

(*) Notice: Subject to any disclaimer, the term of this patent is extended or adjusted under 35 U.S.C. 154(b) by 450 days.

(21) Appl. No.: 12/691,524

(22) Filed: Jan. 21, 2010

Related U.S. Application Data (60) Provisional application No. 61/147,457, filed on Jan. 26, 2009.

(51) Int. Cl.
*H04W 16/04* (2009.01)

(52) U.S. Cl. .................................... 370/230.1

(58) Field of Classification Search ............... 370/230.1
See application file for complete search history.

(56) References Cited

U.S. PATENT DOCUMENTS

| | | | |
|---|---|---|---|
| 5,241,685 A * | 8/1993 | Bodin et al. ............ | 455/453 |
| 7,161,942 B2 | 1/2007 | Chen et al. | |
| 7,245,917 B2 | 7/2007 | Chiueh | |
| 2002/0160811 A1 | 10/2002 | Jannette et al. | |
| 2004/0032828 A1 | 2/2004 | Satt et al. | |
| 2004/0052212 A1 | 3/2004 | Baillargeon | |
| 2004/0071086 A1 | 4/2004 | Haumont et al. | |
| 2004/0100903 A1 | 5/2004 | Han et al. | |
| 2004/0219912 A1 | 11/2004 | Johansson et al. | |
| 2004/0248583 A1 | 12/2004 | Satt et al. | |
| 2005/0041584 A1 | 2/2005 | Lau et al. | |
| 2005/0227699 A1 | 10/2005 | Schreuder et al. | |
| 2006/0153119 A1 | 7/2006 | Ramanna et al. | |
| 2006/0172721 A1 | 8/2006 | Dawson et al. | |
| 2007/0287414 A1 | 12/2007 | Dawson et al. | |
| 2008/0013533 A1 | 1/2008 | Bogineni et al. | |
| 2008/0098062 A1 | 4/2008 | Balia | |
| 2008/0259852 A1 * | 10/2008 | Massiera et al. ............ | 370/329 |

OTHER PUBLICATIONS

3rd Generation Partnership Project (3GPP), "3GPP TS 25.331 Radio Resource Control Protocol Specification", Sep. 2008, http://www.3gpp.org, 1477 pages.
3rd Generation Partnership Project (3GPP), "3GPP TS 25.401 UTRAN Overall Description", Jun. 2008, http://www.3gpp.org, 50 pages.
3rd Generation Partnership Project (3GPP), "3GPP TS 25.413 UTRAN Iu interface Radio Access Network Application Part (RANAP) signaling", Jun. 2008, http://www.3gpp.org, 359 pages.
3rd Generation Partnership Project (3GPP), "3GPP TS 25.433 UTRAN Iub interface Node B Application Part (NBAP) signaling", Sep. 2008, http://www.3gpp.org, 1001 pages.
3rd Generation Partnership Project (3GPP), "3GPP TS 24.008 Mobile radio interface Layer 3 specification; Core network protocols; Stage 3", Sep. 2008, http://www.3gpp.org, 550 pages.
Nokia Siemens Network, "Flexi Intelligent Service Node", 2007, http://nokiasiemensnetworks.com, 16 pages.
Nokia Siemens Network, "Intelligent Packet Core", 2007, http://nokiasiemensnetworks.com, 16 pages.
Arbor Networks, "The Role of Deep Packet Inspection in Mobiel Neworks" Dec. 18, 2008, http://www.cellular-news.com/story/30531.php, 10 pages.

* cited by examiner

*Primary Examiner* — Melvin Marcelo (57) ABSTRACT

Adaptive traffic shaping techniques, apparatuses, and systems can include obtaining information that associates mobile devices with wireless network areas handling wireless communications with the mobile devices and influencing data flow transmissions to the mobile devices associated with the wireless network areas based at least on the obtained information. Adaptive traffic shaping can include determining loading factors for the wireless network areas based on the associations. Techniques, apparatuses, and systems can control data flows to the mobile devices based on associated loading factors.

28 Claims, 8 Drawing Sheets

ADAPTIVE TRAFFIC SHAPING FOR WIRELESS COMMUNICATION SYSTEMS

CROSS REFERENCE TO RELATED APPLICATION

This document claims the benefit of the priority of U.S. Provisional Application Ser. No. 61/147,457, filed Jan. 26, 2009 and entitled "ADAPTIVE TRAFFIC SHAPING FOR WIRELESS COMMUNICATION SYSTEMS."

BACKGROUND

Wireless communication systems such as a wireless network can provide services such as data or voice to mobile devices, e.g., mobile phones, smart phones, wireless access cards, or a laptop with a built-in wireless interface. A base station within a wireless communication system can provide coverage to mobile stations in one or more wireless network areas. A base station can include one or more sectors or access points. A sector can include transmitting and receiving antenna(s) to provide coverage in a corresponding wireless network area. A mobile device can send or receive information on a data flow with an endpoint in a network such as the Internet or a wireless network.

SUMMARY

This specification describes technologies, among other things, to effect adaptive traffic shaping in a wireless communication system.

Methods for adaptive traffic shaping can include obtaining information that associates mobile devices with wireless network areas handling wireless communications with the mobile devices; and influencing data flow transmissions to the mobile devices associated with the wireless network areas based at least on the obtained information. Other implementations can include corresponding method, apparatus, and computer program products.

These, and other aspects, can include one or more of the following features. These, and other aspects, can further include monitoring data flows between the mobile devices and one or more networks; identifying one or more of the data flows to a specific wireless network area by at least using the obtained information; and determining a loading factor for the specific wireless network area based on the identified data flow. Influencing data flow transmissions can include controlling traffic on the identified data flows to the specific wireless network area based on the loading factor. Controlling traffic can include performing an operation on a type of traffic to the specific wireless network area based on the loading factor and one or more threshold values, wherein the operation is one of blocking traffic, forwarding traffic, or rate limiting traffic. These, and other aspects, can include obtaining additional information that indicates a change in data flows associated with the specific wireless network; and updating the loading factor based on the additional information. Controlling traffic can include selecting at least one of the identified data flows for preferential traffic forwarding based on one or more selection criteria. These, and other aspects, can include can include monitoring a transfer of an existing data flow into the specific wireless network area; and updating the loading factor based on the transfer. Controlling traffic can include selecting a different one of the identified data flows for preferential traffic forwarding based on the updated loading factor.

These, and other aspects, can include one or more of the following features. Obtaining the information can include receiving signaling messages associated with the mobile devices. These, and other aspects, can include associating the mobile devices to the wireless network areas based on the signaling messages to generate mapping information. Influencing data flow transmissions to the mobile devices can include communicating the mapping information to a traffic shaping process that controls the data flow transmissions. These, and other aspects, can include obtaining a new signaling message that indicates a different wireless network area for at least one of the mobile devices; updating the mapping information based on the new signaling message; and communicating at least an updated portion of the mapping information to the traffic shaping process. Receiving signaling messages can include receiving a message that includes an identity of a mobile device and an identity of a wireless network area. Receiving signaling messages can include receiving a type of message being one of an attach, handoff, or area update.

A system can include base stations that provide wireless communication coverage in wireless network areas to mobile devices, a monitoring module to obtain signaling messages corresponding to one or more of the base stations and produce associations between the wireless network areas and the mobile devices based on the signaling messages; and a traffic shaping module in communication with the monitoring module to receive the associations, determine loading factors for the wireless network areas based on the associations, and control data flows to the mobile devices associated with the wireless network areas based at least on respective loading factors. Other implementations can include corresponding method, apparatus, and computer program products.

These, and other aspects, can include one or more of the following features. The monitoring module can obtain an additional signaling message and can correspondingly update one of the associations. The traffic shaping module can use the updated association to update a corresponding loading factor. The traffic shaping module can be configured to monitor a transfer of an active data flow to a different wireless network area, and to dynamically update corresponding loading factors based on the transfer. The traffic shaping module can be configured to perform an operation, e.g., blocking traffic, forwarding traffic, or rate limiting traffic, on a type of traffic to a wireless network area based on a respective loading factor and one or more threshold values. The traffic shaping module can be configured to select one or more data flows for preferential traffic forwarding. Preferential traffic forwarding can override a blocking or rate limiting operation. The monitoring module can obtain a type of message being one of attach, handoff, or area update. The monitoring module can be collocated with the traffic shaping module. The monitoring module can be separate from the traffic shaping module.

An apparatus can include a network interface to receive signaling messages corresponding to one or more base stations that provide wireless communication coverage in wireless network areas to mobile devices; and a monitoring module to process the signaling messages, produce associations between the wireless network areas and the mobile devices based on the signaling messages, and communicate the associations to control traffic shaping based on the associations. Other implementations can include corresponding method, system, and computer program products.

These, and other aspects, can include one or more of the following features. An apparatus can also include a traffic shaping module to receive the associations, determine loading factors for the wireless network areas based on the associations, and control data flows to the mobile devices associated with the wireless network areas based at least on respective loading factors. The monitoring module can obtain an additional signaling message and correspondingly updates one of the associations. The traffic shaping module can use the updated association to update a corresponding loading factor. The traffic shaping module can be configured to monitor a transfer of an active data flow to a different wireless network area, and to dynamically update corresponding loading factors based on the transfer. The traffic shaping module can be configured to perform an operation on a type of traffic to a wireless network area based on a respective loading factor and one or more threshold values. The operation can be one of blocking traffic, forwarding traffic, or rate limiting traffic. The traffic shaping module can be configured to select one or more data flows for preferential traffic forwarding. Preferential traffic forwarding can override a blocking or rate limiting operation. A processing unit module can include the traffic shaping module and the monitoring module. The monitoring module can obtain a type of message being one of attach, handoff, or area update.

Particular implementations of the subject matter described in this specification can be implemented to realize one or more of the following potential advantages. Monitoring a device's mobility can allow traffic shaping techniques to adapt to changes in a device's wireless network area. Such monitoring can effect dynamic updates to traffic shaping operations. Adaptive traffic shaping can enhance user experience by adjusting traffic into a heavily congested wireless network area. For example, some adaptive traffic shaping techniques can limit or block traffic of bandwidth intensive applications, such as peer-to-peer file sharing or video services, to increase available bandwidth for other applications or users. Adaptive traffic shaping can preferential forward traffic based on subscriptions or service level agreements (SLAs). For example, a SLA can override a blocking or rate limiting operation. As a result, wireless service operators can generate additional revenue by charging users for such an override. Wireless service operators can prioritize traffic from one or more revenue generating applications over other traffic from different applications. Wireless service operators can block or rate limit a specific type of traffic(s) depending on coverage area loading condition(s).

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Data traffic such as streaming video, mobile TV, gaming, peer-to-peer (P2P) file sharing, and webpage downloads can necessitate a need for increased management of network resources and traffic monitoring to help improve the user experience of applications requiring network resources. Increasing data usage may place higher demands on wireless networks, e.g., fixed capacity in a wireless network area may cause subscribers of a wireless service to compete with other subscribers for a share of the capacity. As a result of increasing data usage, operators of wireless communication systems may increasingly face limits on their wireless resources. For example, such operators may be limited in how they respond to the increased usage because of limited spectrum and fixed capacity in wireless network areas.

Wireless communication systems may experience demand levels that approaches or exceeds capacity in their wireless network areas. Furthermore, demand levels may vary across different wireless network areas and different times of day as mobile devices move in and out of these areas and generate different amounts of traffic. For example, a mobile device may move from one wireless network area to a different wireless network area while maintaining activities on a data flow, such as move may alter bandwidth usages between the two areas. In another example, a wireless network area in an urban area may experience a higher load than one in a rural area. Base stations such as cell towers around a football stadium may experience higher traffic loads during an event. Additionally, different data traffic may place different demands on a communication system. For example, web page downloads can generate traffic bursts whereas P2P file sharing can place a sustained demand on bandwidth.

In some wireless communication systems, air link resources are limited as well as shared between users being served by a common wireless network area. In one such example, High-Speed Downlink Packet Access (HSDPA) uses shared channel transmission, where the total resources available for downlink transmission in a cell are dynamically shared between users. Thus, the high speed downlink transmission operates on the base of allocating a fraction of a downlink resource to data transmission for a specific user(s) at a given time. However, this allocation mechanism is more suitable for bursty data flows than sustained data flows. Sustained data flows such as video streams and P2P traffic may adversely impact other subscribers of the shared resource.

Furthermore, limited bandwidth in a wireless network area can further place subscribers and operators at a disadvantage. Subscribers may have to compete for bandwidth. Wireless communication system operators may be unable to meet service level agreements (SLAs) in place with one or more subscribers. Additionally, an operator may be unable to provide premium services during times of network area congestion. Traffic shaping techniques may improve user experience by, for example, limiting the impact an abusive user or application has on other users or applications sharing a communication channel. Traffic shaping techniques include static and dynamic methods.

Static traffic shaping techniques can allow, rate limit, or block different data flows in or between networks based on one or more criteria. Traffic shaping techniques can use deep packet inspection (DPI) to identify an application type. For example, traffic shaping techniques can include blocking or rate limiting traffic associated with a specific application such as P2P file sharing by using DPI to identify P2P traffic. Furthermore, traffic shaping techniques can grant a higher Quality of Service (QoS) to a specific application(s) or mobile device(s). In some implementations, traffic shaping techniques can prioritize different types of data traffic, e.g., traffic from an enterprise application can take priority over a video stream. However, static traffic shaping techniques, e.g., considering only the application type, may uniformly rate limit or entirely block specific types of traffic. Furthermore, static techniques may not be effective in shared communication channels where one mobile device's traffic adversely impact other subscribers.

Dynamic traffic shaping techniques can allow, rate limit, or block different data flows into one or more network areas based on one or more criteria. Compared with static traffic shaping techniques, dynamic control of data flows over network resources may result in a better distribution of resources between multiple mobile devices in a wireless communication system. Dynamic techniques such as adaptive traffic shaping (ATS) can take into consideration dynamic factors such as current network area loading, user location, and/or time of day to adapt traffic flows to current conditions. For example, an ATS technique can rate limit P2P traffic to highly congested wireless network areas while allowing P2P traffic to non-congested wireless network areas. As network loading changes, the ATS technique can re-adjust the rate limitations or blocking operations. In some implementations, ATS techniques can permit P2P traffic to highly congested network areas if such traffic is associated with a mobile device with a SLA that allows such action.

ATS techniques can process signaling messages between one or more wireless network components to determine wireless network area endpoints for data flows flowing through a wireless network. In some implementations, message parameters from protocols such as Radio Resource Control (RRC) and Radio Access Network Application Part (RANAP) can be used to extract details about data session of subscribers. For example, ATS techniques can derive location information, e.g., a specific wireless network area such as a cell sector, for a mobile device from a signaling message, and correspondingly associate the information with one or more data flows to the mobile device. Examples of a wireless network components include a base station, a system including a base station such as a base station sub-system (BSS), network access point, Node B, radio node controller (RNC), ASN (Access Service Network) Gateway or Core Network components such as Serving GPRS Support Node (SGSN), Gateway GPRS Support Node (GGSN), and serving gateways.

An adaptive traffic shaping system can include a traffic shaping module to adaptively shape traffic and a monitoring module to process the signaling messages and can derive the required network area information for the data flows. In some implementations, these modules can reside at different locations within a wireless communication system, in one location, or can be integrated together as a unit, or can be integrated into a wireless network node such as a RNC or SGSN. In some wireless communication systems, signaling messages can include cell sector id, service area, or other network area identification.

An adaptive traffic shaping system can inspect signaling flows to identify data packets going to a specific wireless network areas and can dynamically map mobile devices/data flows to wireless network areas. The system can create a continuous instantiation of data flows in a given network area. For hand-off events, the system can monitor the signaling flows to determine the new wireless network area for a mobile device and can move associated data flows to the new target wireless network area.

The system can perform rate monitoring by calculating an aggregate data flow to a specific wireless network area to determine a resource loading factor for the specific network area. The system can track resource loading for multiple wireless network areas. The system can compare a loading factor to high and low watermark values for traffic shaping determinations. For example, after a cell site hits a low watermark, the system can start allowing P2P traffic; at high watermark conditions, the system can block P2P traffic.

Figure 1:
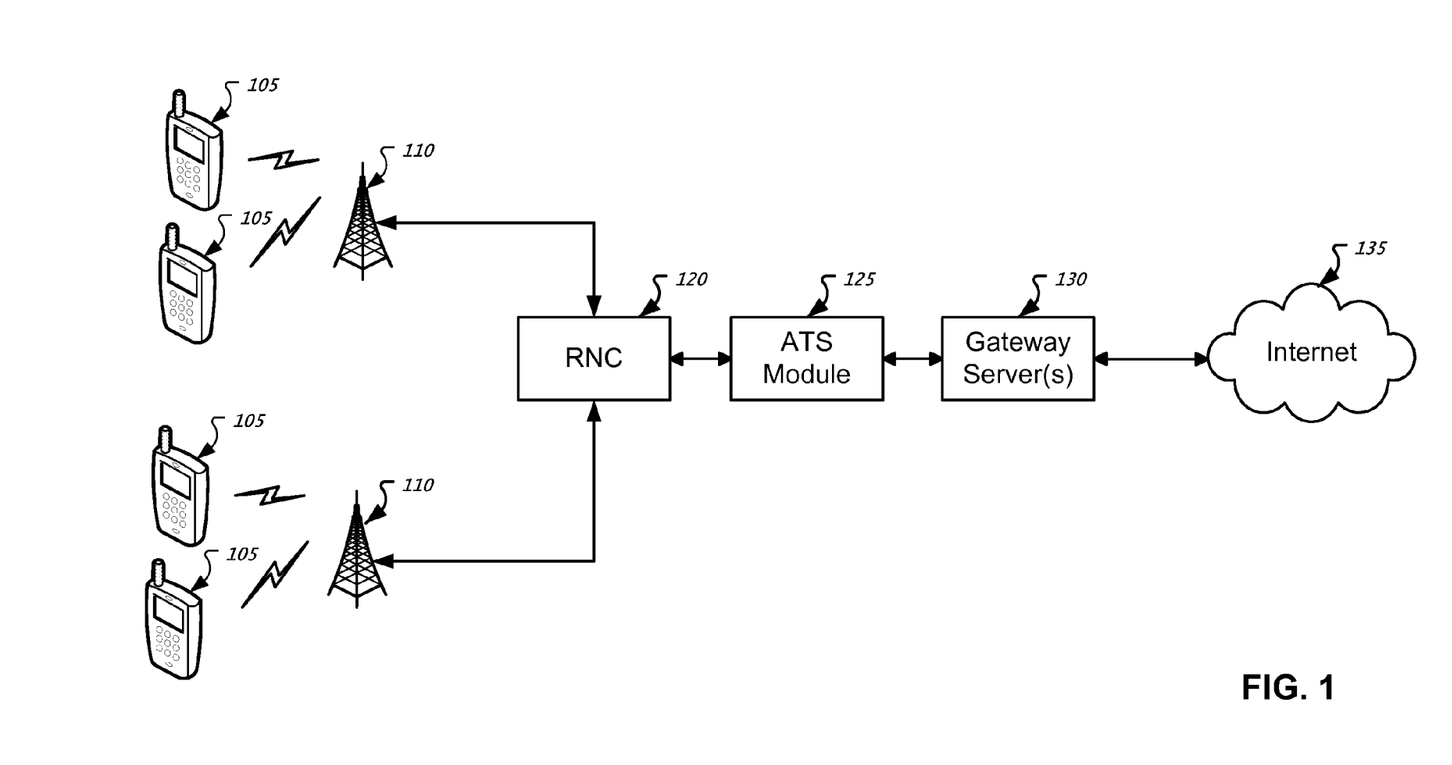
FIG. 1 shows an example of a wireless communication system with adaptive traffic shaping.

FIG. 1 shows an example of a wireless communication system. A wireless communication system can include one or more base stations 110 to communicate with mobile devices 105 using one or more wireless network protocols under technologies such as GSM 2.5G, WCDMA based UMTS 3G or Long Term Evolution (LTE), Code division multiple access (CDMA), CDMA EV-DO, CDMA EV-DV, WiMax, etc. For example, a wireless communication system can communicate using a wireless standard such as Universal Mobile Telecommunications System (UMTS), General Packet Radio Service (GPRS), WiMax, CDMA, High Speed Packet Access (HSPA), or High-Speed Downlink Packet Access (HSDPA). Examples of specific wireless standards include 3GPP TS 25.401 UTRAN Overall Description, 3GPP TS 25.413: UTRAN Iu interface Radio Access Network Application Part (RANAP) signaling, 3GPP TS 25.433: UTRAN Iub interface Node B Application Part (NBAP) signaling; TS 24.008: Mobile radio interface Layer 3 specification; Core network protocols; Stage 3; and 3GPP TS 25.331 Radio Resource Control Protocol Specification.

A wireless communication system can provide services such as data and voice to multiple mobile devices 105 such as mobile phones, smart phones, personal data assistant (PDA), computer systems with a wireless access device, portable devices with an air card, and other wireless devices. Mobile devices 105 can establish data flows with a network such as the Internet 135. Likewise, different endpoints within a wireless communication system, including mobile stations, or a network such as the Internet 135 can establish data flows with the mobile devices 105. During operation, a mobile device 105 can switch between different base stations 110 for service. A data flow can remain established during a transfer such as a hand-over from one base station to a different base station.

A controller such as Radio Network Controller (RNC) 120 can control one or more base stations 110. In some implementations, a base station 110 can be an element in a base station sub-system (BSS). A base station 110 can operate one or more wireless network areas, e.g., cell sector, cell site, or access point. A base station 110 can include transmitting and receiving antenna(s) to provide coverage in a wireless network area. RNC 120 can communicate with one or more gateway servers 130 in a core network. Gateway servers 130 can include a mobile switching center (MSC), Serving GPRS Support Node (SGSN), or a Gateway GPRS Support Node (GGSN).

A wireless communication system can include an adaptive traffic shaping (ATS) module 125. In some implementations, ATS module 125 is integrated with the RNC 120 or a gateway server 130 such as a SGSN. In some implementations, ATS module 125 is collocated or housed with the RNC 120 or a gateway server 130 such as a SGSN. In some implementations, ATS module 125 is located between a base station 110 and the RNC 120. In some implementations, ATS module 125 is located between RNC 120 and a gateway server 130. Alternatively, ATS module 125 can be connected to an internal network that communicatively links components in a wireless communication system. Furthermore, the functionality of ATS module 125 can be split into a monitor module and a traffic shaping module; such modules can be collocated or separated.

Figure 2:
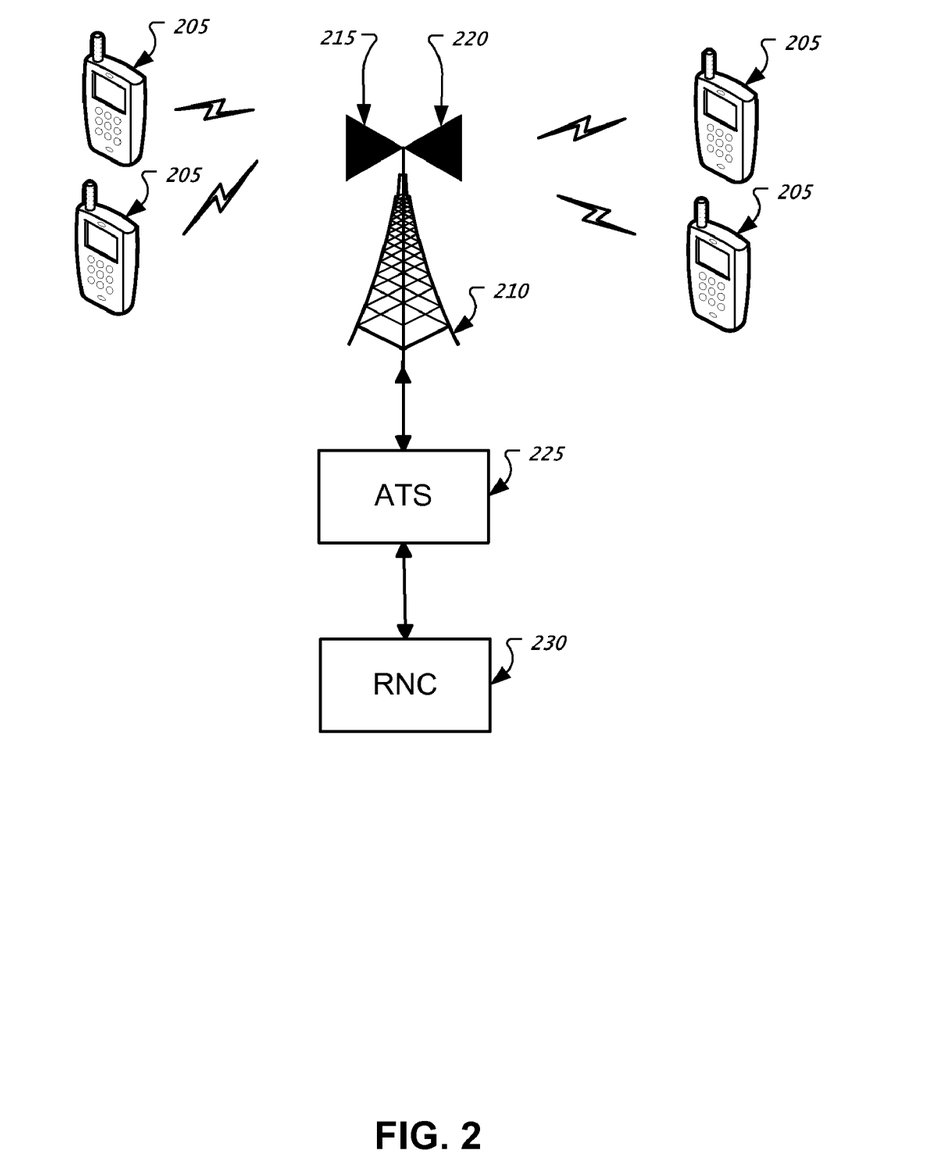
FIG. 2 shows an example of a adaptive traffic shaping system with a multi-sector base station.

FIG. 2 shows an example of a system with a multi-sector base station. A base station 210 can include multiple wireless network areas such as cell sectors 215, 220. Each cell sector 215, 220 can include transmitting and receiving antennas to communicate with mobile devices 205. In some implementations, ATS module 225 is located between the base station 210 and the RNC 230. In some implementations, the RNC 230 can include the ATS module 225 as an integrated component or blade insert.

Figure 3:
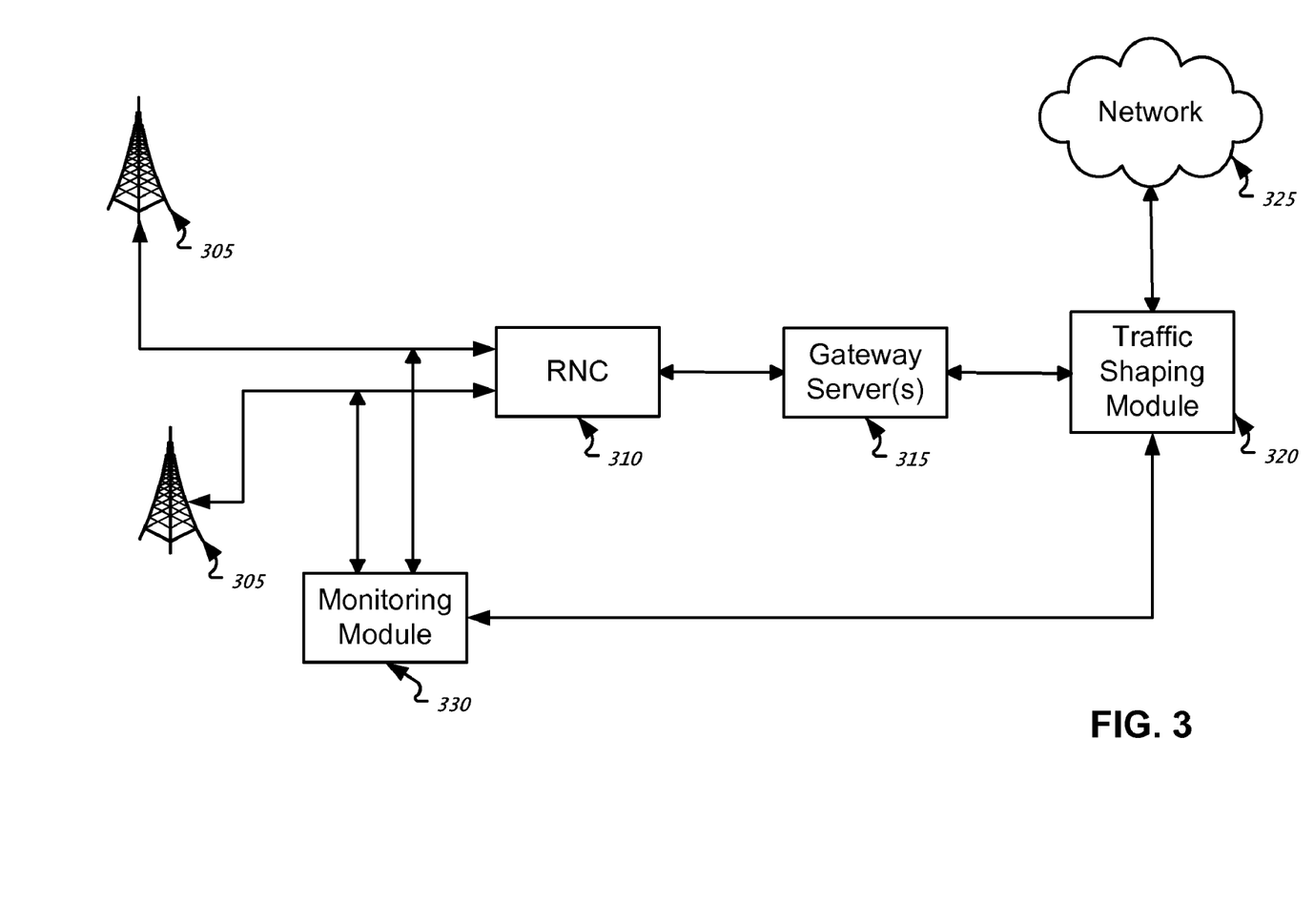
FIG. 3 shows an example of a multiple component adaptive traffic shaping system.

FIG. 3 shows an example of a multiple component adaptive traffic shaping system within a wireless communication system. Adaptive traffic shaping system can include a monitoring module 330 and a traffic shaping module 320. The monitoring module 330 can receive and process signaling messages between base stations 305 and RNC 310 as well as messages from other components with a wireless communication system. The traffic shaping module 320 can shape traffic flowing between network 325 and one or more mobile devices being served by a base station 305 within the system. The traffic shaping module 320 can be connected to an internal network that communicatively links components within a wireless communication system such as base stations 305, RNC 310, and one or more gateway servers 315. In some implementations, the RNC 310 or a gateway server 315 can include the traffic shaping module 320. The traffic shaping module 330 can receive user location information, such as associations between mobile devices and respective wireless network areas, to make traffic shaping determinations.

Figure 4A:
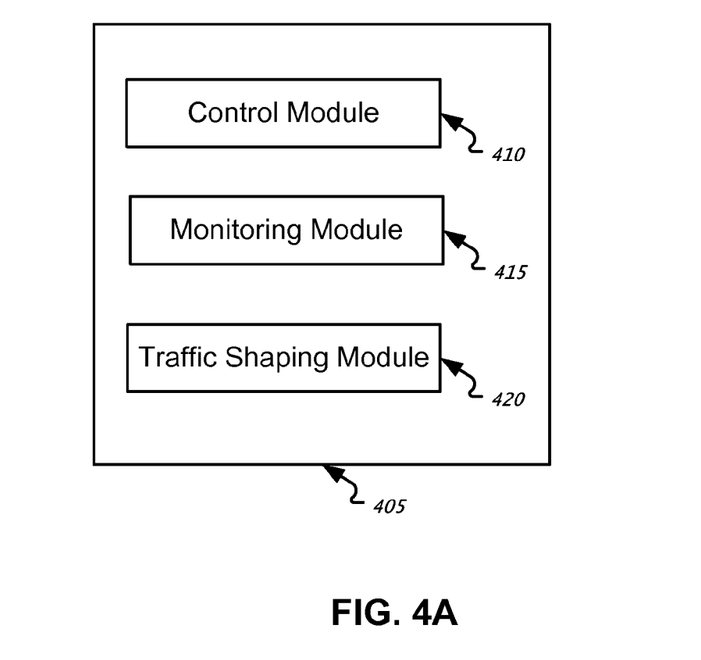
FIGS. 4A,4B show different examples of adaptive traffic shaping implementations.
Figure 4B:
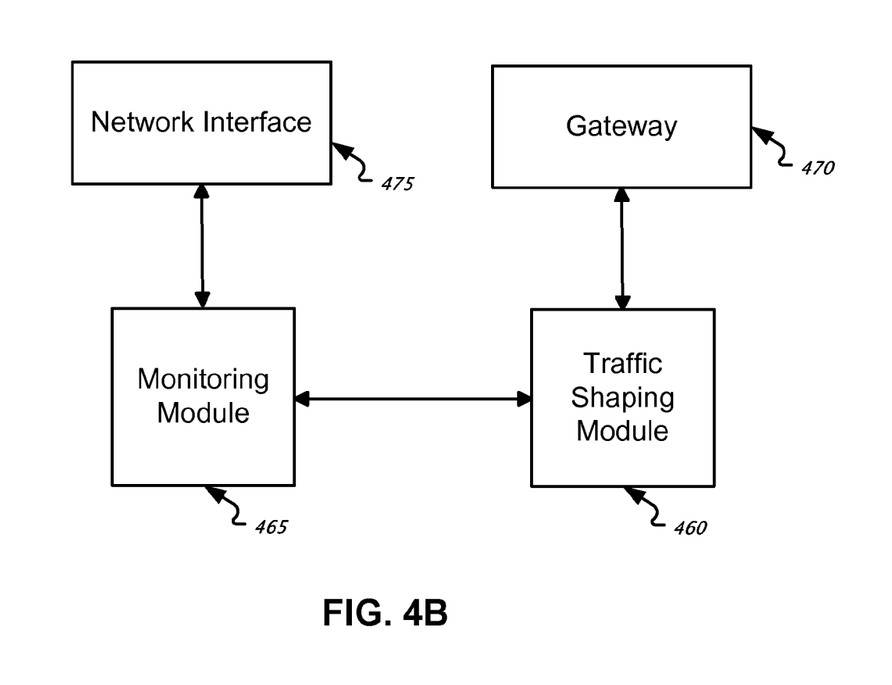

FIGS. 4A, 4B show different examples of adaptive traffic shaping implementations. A wireless communication system can include one or more adaptive traffic shaping implementations and can include different types of implementations. A wireless communication system can include one on more pieces of equipment to implement monitoring and traffic shaping functions described herein. A traffic shaping module or a processing unit module can run one or more traffic shaping processes. A monitoring module or a processing unit module can run one or more monitoring processes. In some implementations, a process can include a traffic shaping process and a monitoring process, and can include one or more threads.

As shown in FIG. 4A, one piece of network equipment 405 in a wireless network can include multiple adaptive traffic shaping components. Network equipment 405 can include a control module 410, a monitoring module 415, and traffic shaping module 420. Control module 410 can process traffic for a wireless network, can manage mobile devices registrations, and can act as a gateway between a wireless network and the Internet. In some implementations, network equipment 405 can include multiple blade slots for inserting modules 410, 415, 420. Modules 410, 415, 420 can include one or more processing units and/or specialized logic. In some implementations, a module 410, 415, 420 can include a general purpose processor(s) to perform the operations described herein. Control module 410 can process traffic for a wireless network, can manage mobile devices registrations, and can act as a gateway between a wireless network and the Internet. In some implementations, network equipment 405 can include one or more processing units to implement the functionality of one or more modules 410, 415, 420 shown in FIG. 4A. In some implementations, network equipment 405 can include a general purpose processor(s) configured to perform the functions of one or more modules 410, 415, 420. In some implementations, monitoring module 415 and traffic shaping module 420 are integrated into a single module or blade. Network equipment 405 can include an RNC or SGSN.

As shown in FIG. 4B, an adaptive traffic shaping system can include a traffic shaping module 460 separate from a monitoring module 465. A traffic shaping module 460 can effect traffic shaping for a gateway 470 between a network such as the Internet and one or more wireless networks. Traffic shaping module 460 can communicate with a monitoring module 460 over a private network, wireless network, or a public network such as the Internet. A gateway 470 can forward data to a traffic shaping module 460 for traffic shaping. In some implementations, gateway 470 can receive a traffic shaping determination from traffic shaping module 460 to shape traffic. A gateway 470 and modules 465, 460, 420 can include one or more processing units and can include specialized logic. In some implementations, monitoring module 465 and traffic shaping module 460 are collated in a building, equipment shelter, or network equipment. In some implementations, gateway 470 and traffic shaping module 460 are integrated into a single unit. In some implementations, gateway 470 and traffic shaping module 460 are collocated or housed together. The monitoring module 465 apparatus can communicate with a network interface 475. Network interface 475 can receive signaling messages and can forward signaling messages to the monitoring module 465. A device can include the monitoring module 465 and the network interface 475. Such a device can include multiple interfaces for receiving messages from different network components.

Figure 5:
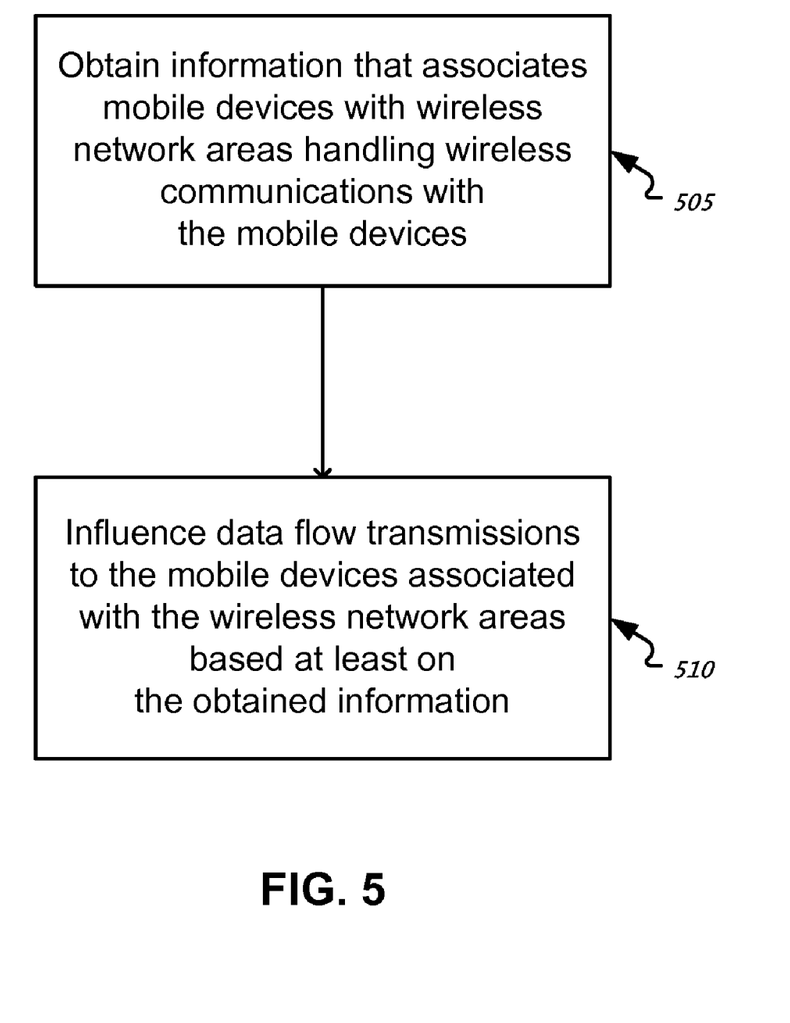
FIG. 5 shows an example process flow within an adaptive traffic shaping system.
Figure 6:
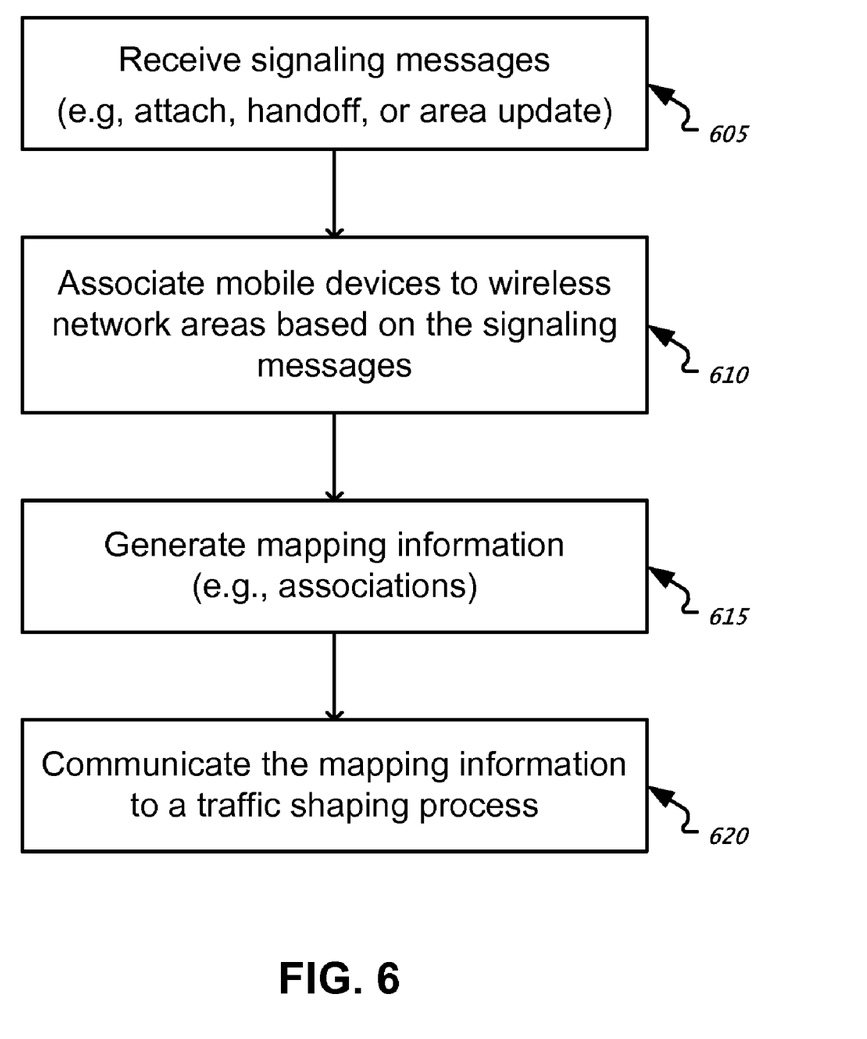
FIG. 6 shows an example of a monitoring process flow.
Figure 7:
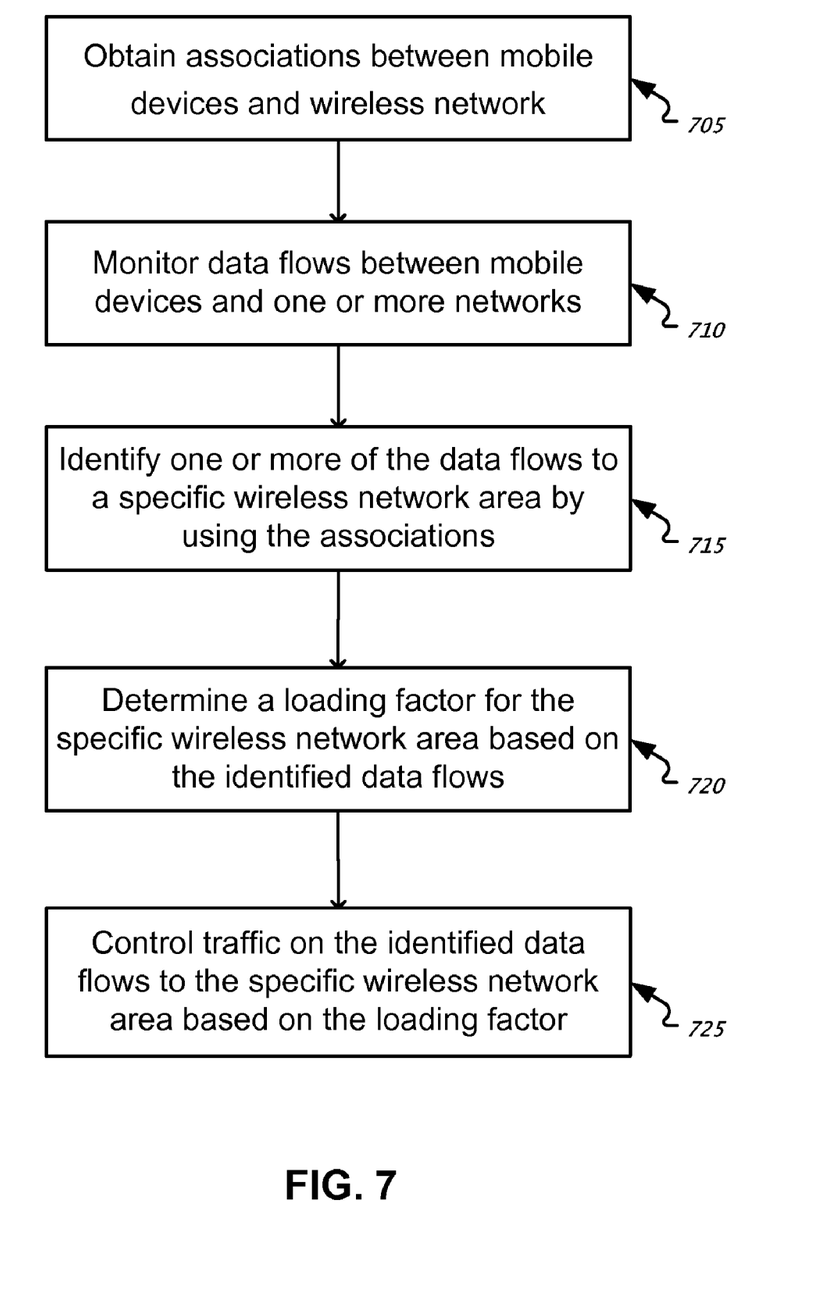
FIG. 7 shows an example of a traffic shaping process flow.

FIG. 5 shows an example process flow within an adaptive traffic shaping system. An adaptive traffic shaping system can obtain 505 information that associates mobile devices with wireless network areas handling wireless communications with the mobile devices. The system can influence 510 data flow transmissions to the mobile devices associated with the wireless network areas based at least on the obtained information. FIG. 6 shows an example of a monitoring process within an adaptive traffic shaping system. FIG. 7 shows an example of a traffic shaping process within an adaptive traffic shaping system.

FIG. 6 shows an example of a monitoring process flow. Monitoring can include receiving 605 signaling messages such as connection setup or network area update indication messages from a network component(s) such as a BS or observing message exchanges between network components. A signaling message can include an identity of a mobile device and an identity of a wireless network area. In some implementations, types of signaling message can include attach, handoff, and area update. An attach message can indicate a mobile device registration with a wireless communication system. A handoff message can indicate a change in a wireless network area that serves data on an existing data flow. For example, a mobile device is handed off to a different wireless network area, and in the process, causes a handoff message to be sent within a wireless communication system. An area update can signal a change in wireless network area. For example, a mobile device moving to a different wireless network area without an active data flow can cause an area update message to be sent within a wireless communication system.

Monitoring can include associating 610 mobile devices to wireless network areas based on the signaling messages and can include generating 615 mapping information, e.g., associations. Generating 615 mapping information can include grouping the mobile devices and/or associated data flows, based on wireless network area identity. In some implementations, generating 615 mapping information can include grouping the mobile devices based on wireless network area identity. Generating 615 mapping information can include listing a mobile device identity with a respective wireless network area identity. A monitoring module or process can communicate 620 the mapping information to a traffic shaping process, e.g., a processing running on a traffic shaping module or a processing unit module.

FIG. 7 shows an example of a traffic shaping process flow. Traffic shaping can include obtaining 705 associations between mobile devices/associated data flows and wireless network areas. In some implementations, traffic shaping can include obtaining 705 associations between mobile devices and wireless network areas. In some implementations, obtaining 705 associations can include receiving mapping information from a monitoring module or process. Traffic shaping can include monitoring 710 data flows between mobile devices and one or more networks such as the Internet. In some implementations, a data flow can include a Transmission Control Protocol (TCP) over Internet Protocol (IP) connection traffic or can include User Datagram Protocol (UDP) over IP traffic. In some implementations, a data flow can include IP multicast traffic and an association can be between multiple mobile devices and an endpoint in the Internet.

Traffic shaping can include identifying 715 one or more of the data flows to a specific wireless network area by using the associations. In some implementations, identifying 715 a data flow can include matching a data flow identifier associated with the data flow to an identifier of a mobile device known to be associated with the specific wireless network area. In some implementations, identifying 715 a data flow can include matching a destination IP address in a packet of the data flow to an IP address of a mobile device known to be associated with the specific wireless network area.

Traffic shaping can include determining 720 a loading factor for the specific wireless network area based on the identified data flows. In some implementations, determining 720 a loading factor can include an aggregate data transfer rate to the specific wireless network area. For example, if one data flow is using 0.5 Mbps (megabits per second) worth of bandwidth and a second data flow is using 0.7 Mbps worth of bandwidth, then the aggregate data transfer rate for the two flows in this example is 1.2 Mbps. Determining 720 a loading factor can include expressing an aggregate data transfer rate as a percentage of link capacity at the wireless network area (e.g., the wireless network area's capacity is 5 Mbps). Other techniques for determining a loading factor are possible. When handling multiple wireless network areas, a loading factor can be determined for each wireless network area.

Traffic shaping can include controlling 725 traffic on the identified data flows to the specific wireless network area based on the loading factor. Controlling traffic 725 can include performing an operation on a type of traffic to the specific wireless network area based on the loading factor and one or more threshold values. Such an operation can be one of blocking traffic, forwarding traffic, or rate limiting traffic. For example, if the loading factor reaches a high watermark value, controlling traffic 725 can include blocking traffic such as P2P or video streams. In another example, if the loading factor reaches a low watermark value, controlling traffic 725 can include forwarding traffic such as P2P or video streams. In some implementations, traffic shaping can impose rate limits on one or more traffic types. Traffic shaping can include inspecting a data packet to determine an associated application, subscription agreement, or SLA. If an associated application, subscription agreement, or SLA warrants preferential treatment, then traffic shaping can include overriding a blocking or rate limiting operation. In some implementations, an override can be suspended in a high capacity utilization conditions. Traffic can be controlled differently for different loading factors and wireless network areas.

Figure 8:
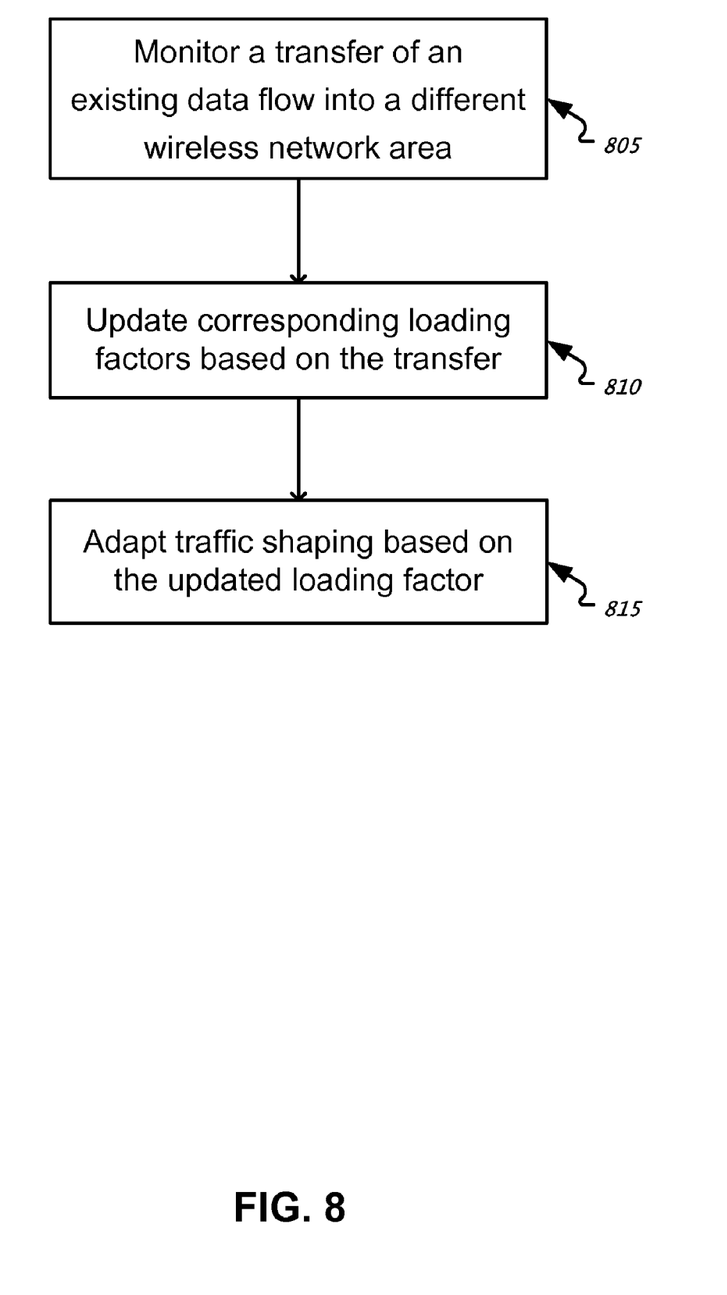
FIG. 8 shows a process example of adapting to a change in wireless network areas for a data flow.

FIG. 8 shows a process example of adapting to a change in wireless network areas for a data flow. A process can monitor 805 a transfer of an existing data flow into a different wireless network area. Monitoring 805 a transfer can include obtaining new a signaling message that indicates a change in wireless network area. Monitoring 805 a transfer can include receiving an updated association between a mobile device and wireless network area. The process can update 810 corresponding loading factors based on the transfer. The process can adapt 815 to the updated loading factor to dynamically control traffic shaping. For example, the transfer can cause a decrease in a loading factor in the previous wireless network area and an increase in the loading factor associated with the new wireless network area for the data flow. Adapting 815 can include controlling traffic differently to the effected wireless network area. For example, a decrease in loading factor can cause a forwarding of a type of traffic or change preferential treatment of a data flow. An increase in loading factor can cause a blocking of a type of traffic or can cause a change in preferential traffic forwarding for a data flow.

In some implementations, an adaptive traffic shaping system can extract a mobile identity and a network area identifier from signaling messages for new users registering into a wireless network. The system can update a network area identity associated with a mobile device each time a new network area identity is received in a signaling message. The system can maintain context for each mobile device. Once the voice call or data call bearers are set up, the system can derive mappings between users and wireless network areas and can update relevant session parameters in the user contexts. The system can extract information and parameters from relevant messages and store the information in a user context. Post processing of the stored information can include sorting mobile devices per wireless network area to produce associations, checking QoS parameters associated with a data session, and generating information on bandwidth per user. In some implementations, post processing can include sorting mobile devices per cell sector or access point.

The adaptive traffic shaping system can use real time data to make real time traffic shaping determinations. For example, if a mobile device changes wireless network areas, an adaptive traffic shaping system can receive corresponding signaling messages in real time and update associated traffic shaping determinations. Some wireless network implementations may need to be reconfigure in order to not only send a signaling message indicative of a wireless network area change to a core network, but also send the message to a monitoring module such that the module can observe such a message. In some implementations, a monitoring module can observe a signal message transaction.

An adaptive traffic shaping system can manage multiple data sessions based on associated user subscription of services and current load conditions. In high load conditions, a wireless network can use a shaping system for one or more of fair sharing of the wireless network's resources, prioritizing premium subscriber traffic, rate limiting or blocking specified traffic types such as P2P or video streaming, and/or prioritizing gaming traffic. In low load conditions, a wireless network can allow bandwidth intensive traffic types such as P2P and video streaming. The shaping system can enhance geographic and/or time-of-day based charging models.

An adaptive traffic shaping system can enhance the SLAs of current traffic control applications where the relevant mobility related parameters can be trapped from signaling messages and fed into the traffic control systems that are currently deployed in an existing wireless networks. A traffic controller can use the additional mobility parameters along with parameters such as subscriber id, application type, and time of the day.

In some implementations, a traffic shaping module that can be added into an existing wireless network. A traffic shaping module can be inserted as a bump in a wire solution, connected to a control plane of the wireless network, or can be introduced as a co-located module inside current network equipment such as RNC, SGSN, GGSN, or similar types of nodes. In network that use LTE or WiMax technology a traffic shaping module can operate in an access network or core side to inspect the required signaling message traffic.

A GPRS network can implement adaptive traffic shaping techniques. The following includes examples of GPRS based implementations. In a GPRS network, a wireless network area includes a cell. A cell update takes place when a mobile device such as a mobile station (MS) enters a different cell inside the current Routing Area (RA) and the MS is in a READY state. If the RA has changed, a routing area update is executed instead of a cell update.

The MS performs the cell update procedure by sending an uplink Logical Link Control (LLC) frame of any type, except the LLC NULL frame, containing the MS's identity to the SGSN. The frame includes information to identity the new cell, e.g., a Cell Identity (CI) field. If the network and the MS support the Cell Notification, then the MS uses the LLC NULL frame containing the MS's identity in order to perform a cell update.

After receiving a LLC frame from the MS, the Base Station System (BSS) can add a Cell Global Identity to the received frame to generate BSSGP (BSS GPRS Protocol) frames. The Cell Global Identity can include a Cell Identity, Routing Area Code (RAC), and Location Area Code (LAC). The BSS can send the BSSGP frames towards a SGSN.

In a SGSN, a correctly received and valid LLC PDU carried inside a BSSGP Protocol Data Unit (PDU) containing a new identifier of the cell can trigger a cell update. The SGSN records this MS's cell change and future traffic towards the MS is forwarded to the new cell. If requested by the GGSN according to charging requirements the SGSN also forwards the new CGI to the GGSN. The cell identity can be identified from the LLC and BSSGP frames over the Gb interface or from GPRS Tunneling Protocol (GTP) messages over the Gp interface.

A UMTS network can implement adaptive traffic shaping techniques. The following includes examples of UMTS based implementations. A Cell Identifier (C Id) in a UMTS network uniquely identifies a cell within a Radio Network Subsystem (RNS). In communication with a Radio Network Controller (RNC) across the Iu PS or Uu interfaces, a Radio Access Bearer (RAB) ID can identify a radio access bearer and that information element can equal an associated NSAPI value. In the RNC, a RAB ID identifies a RAB context. Radio Bearer Identity (RB Identity) can identify an Uu interface radio bearer(s) associated with the radio access bearer. The Radio Bearer Identity corresponds with logical channel resources allocated in a given cell location. In other words, a user data flow corresponds with a RAB, a RB, and hence a wireless network area such as a cell in a UMTS network.

Adaptive traffic shaping techniques can use information contained in one or more signaling messages to associate a data flow of a mobile device to a specific wireless network area. A monitoring module can obtaining signaling messages in one or more of the following UMTS message exchanges. A RNC can send an initial User Equipment (UE) message to the Core Network (CN). A CN can send a relocation request to a target RNC, and the target RNC can send a relocation request acknowledge message to the CN. A UE can send an initial direct transfer message to a UMTS Terrestrial Radio Access Network (UTRAN). A UE can send a cell update message to a UTRAN, and the UTRAN can send a cell update confirm message to the UE.

A monitoring module in a UMTS network can process one or more of the following signaling messages to extract mobile device/wireless network area associations. Such signaling can include RRC Connection Request (e.g., see Cell Id and UE Id therein); Cell Update; URA Update; Cell Reselection; RANAP Initial UE Message (e.g., UE Id and Service Area Id (SAI)); and a RANAP Relocation Request Message (e.g., Target Cell Id). Additional signaling messages can include NAS messages such as Attach Request; Routing Area Update (e.g., UE Id, subscription information, and Service Area Id (SAI)); and PDP Context Request (e.g., UE Id, Tunnel Id, RAB Id).

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the described subject matter. Accordingly, other embodiments are within the scope of the following claims.

What is claimed is:

1. A system comprising:
    base stations that provide wireless communication coverage in wireless network areas to mobile devices;
    a monitoring module to obtain signaling messages corresponding to one or more of the base stations and produce associations between the wireless network areas and the mobile devices based on the signaling messages; and
    a traffic shaping module in communication with the monitoring module to receive the associations, determine loading factors for the wireless network areas based on the associations, and control data flows to the mobile devices associated with the wireless network areas based at least on respective loading factors.

2. The system of claim 1, wherein the monitoring module obtains an additional signaling message and correspondingly updates one of the associations, wherein the traffic shaping module uses the updated association to update a corresponding loading factor.

3. The system of claim 1, wherein the traffic shaping module is configured to monitor a transfer of an active data flow to a different wireless network area, and to dynamically update corresponding loading factors based on the transfer.

4. The system of claim 1, wherein the traffic shaping module is configured to perform an operation on a type of traffic to a wireless network area based on a respective loading factor and one or more threshold values, wherein the operation is one of blocking traffic, forwarding traffic, or rate limiting traffic.

5. The system of claim 4, wherein the traffic shaping module is configured to select one or more data flows for preferential traffic forwarding, wherein preferential traffic forwarding overrides a blocking or rate limiting operation.

6. The system of claim 1, wherein the monitoring module obtains a type of message being one of attach, handoff, or area update.

7. The system of claim 1, wherein the monitoring module is collocated with the traffic shaping module.

8. The system of claim 1, wherein the monitoring module is separate from the traffic shaping module.

9. An apparatus comprising:
    a network interface to receive signaling messages corresponding to one or more base stations that provide wireless communication coverage in wireless network areas to mobile devices; and
    a monitoring module to process the signaling messages, produce associations between the wireless network areas and the mobile devices based on the signaling messages, and communicate the associations to control traffic shaping based on the associations.

10. The apparatus of claim 9, further comprising:
    a traffic shaping module to receive the associations, determine loading factors for the wireless network areas based on the associations, and control data flows to the mobile devices associated with the wireless network areas based at least on respective loading factors.

11. The apparatus of claim 10, wherein the monitoring module obtains an additional signaling message and correspondingly updates one of the associations, wherein the traffic shaping module uses the updated association to update a corresponding loading factor.

12. The apparatus of claim 10, wherein the traffic shaping module is configured to monitor a transfer of an active data flow to a different wireless network area, and to dynamically update corresponding loading factors based on the transfer.

13. The apparatus of claim 10, wherein the traffic shaping module is configured to perform an operation on a type of traffic to a wireless network area based on a respective loading factor and one or more threshold values, wherein the operation is one of blocking traffic, forwarding traffic, or rate limiting traffic.

14. The apparatus of claim 13, wherein the traffic shaping module is configured to select one or more data flows for preferential traffic forwarding, wherein preferential traffic forwarding overrides a blocking or rate limiting operation.

15. The apparatus of claim 10, wherein a processing unit module comprises the traffic shaping module and the monitoring module.

16. The apparatus of claim 9, wherein the monitoring module obtains a type of message being one of attach, handoff, or area update.

17. A method for adaptive traffic shaping, the method comprising:
    obtaining information that associates mobile devices with wireless network areas handling wireless communications with the mobile devices, wherein obtaining the information comprises receiving signaling messages associated with the mobile devices; and
    influencing data flow transmissions to the mobile devices associated with the wireless network areas based at least on the obtained information.

18. The method of claim 17, further comprising:
    monitoring data flows between the mobile devices and one or more networks;
    identifying one or more of the data flows to a specific wireless network area by at least using the obtained information; and
    determining a loading factor for the specific wireless network area based on the identified data flows, wherein influencing data flow transmissions comprises controlling traffic on the identified data flows to the specific wireless network area based on the loading factor.

19. The method of claim 18, wherein controlling traffic comprises performing an operation on a type of traffic to the specific wireless network area based on the loading factor and one or more threshold values, wherein the operation is one of blocking traffic, forwarding traffic, or rate limiting traffic.

20. The method of claim 18, further comprising:
obtaining additional information that indicates a change in data flows associated with the specific wireless network; and
updating the loading factor based on the additional information.

21. The method of claim 18, wherein controlling traffic comprises selecting at least one of the identified data flows for preferential traffic forwarding based on one or more selection criteria.

22. The method of claim 21, further comprising:
monitoring a transfer of an existing data flow into the specific wireless network area; and
updating the loading factor based on the transfer.

23. The method of claim 22, wherein controlling traffic comprises selecting a different one of the identified data flows for preferential traffic forwarding based on the updated loading factor.

24. The method of claim 17, further comprising:
associating the mobile devices to the wireless network areas based on the signaling messages to generate mapping information.

25. The method of claim 24, wherein influencing data flow transmissions to the mobile devices comprises communicating the mapping information to a traffic shaping process that controls the data flow transmissions.

26. The method of claim 25, further comprising:
obtaining a new signaling message that indicates a different wireless network area for at least one of the mobile devices;
updating the mapping information based on the new signaling message; and
communicating at least an updated portion of the mapping information to the traffic shaping process.

27. The method of claim 17, wherein receiving signaling messages comprises receiving a message that comprises an identity of a mobile device and an identity of a wireless network area.

28. The method of claim 17, wherein receiving signaling messages comprises receiving a type of message being one of an attach, handoff, or area update.

* * * * *